(12) United States Patent
Munteanu et al.

(10) Patent No.: US 10,552,108 B2
(45) Date of Patent: Feb. 4, 2020

(54) METHOD OF PRINT JOB PROGRAMMING FOR PRODUCING A PAD

(71) Applicant: Océ Holding B.V., Venlo (NL)

(72) Inventors: Andra T. Munteanu, Venlo (NL); Jean Marc C. A. Steux, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 16/200,182

(22) Filed: Nov. 26, 2018

(65) Prior Publication Data
US 2019/0095159 A1 Mar. 28, 2019

Related U.S. Application Data

(63) Continuation of application No. PCT/EP2017/062368, filed on May 23, 2017.

(30) Foreign Application Priority Data

May 27, 2016 (EP) ..................... 16171785

(51) Int. Cl.
| | |
|---|---|
| *G06F 3/12* | (2006.01) |
| *B42C 19/02* | (2006.01) |
| *G03G 15/00* | (2006.01) |
| *H04N 1/00* | (2006.01) |

(52) U.S. Cl.
CPC .......... *G06F 3/1262* (2013.01); *B42C 19/02* (2013.01); *G03G 15/5087* (2013.01); *G06F 3/1204* (2013.01); *G06F 3/125* (2013.01); *G06F 3/1205* (2013.01); *G06F 3/1208* (2013.01); *G06F 3/1285* (2013.01); *H04N 1/00957* (2013.01)

(58) Field of Classification Search
None
See application file for complete search history.

(56) References Cited

U.S. PATENT DOCUMENTS

| | | | |
|---|---|---|---|
| 2008/0151285 A1 | 6/2008 | Morales et al. | |
| 2011/0158727 A1* | 6/2011 | Yamakawa | H04N 1/00222 399/407 |

OTHER PUBLICATIONS

International Search Report for PCT/EP2017/062368 (PCT/ISA/210) dated Aug. 21, 2017.
Written Opinion of the International Searching Authority for PCT/EP2017/062368 (PCT/ISA/237) dated Aug. 21, 2017.

* cited by examiner

*Primary Examiner* — Andrew H Lam
(74) *Attorney, Agent, or Firm* — Birch, Stewart, Kolasch & Birch, LLP (57) ABSTRACT

A job programming method includes using a processor to assemble a printable file based on more than two reference pages and print instructions; including printer readable instructions in the printable file to print more than one copy of a reference page; grouping a first set of reference pages into a first group based on a first plurality of print instructions to assemble a first part of the printable file; grouping a second set of reference pages into a second group based on a second plurality of print instructions to assemble a second part of the printable file; including printer readable instructions in the printable file to direct printed pages corresponding to the printer readable instructions to print more than one copy of the reference page to a common stack, and to direct printed pages corresponding to the first and second parts of the printable file to the common stack.

20 Claims, 4 Drawing Sheets

METHOD OF PRINT JOB PROGRAMMING FOR PRODUCING A PAD

CROSS REFERENCE TO RELATED APPLICATIONS

This application is a Continuation of International Application No. PCT/EP2017/062368, filed on May 23, 2017, and for which priority is claimed under 35 U.S.C. § 120. PCT/EP2017/062368 claims priority under 35 U.S.C. § 119 to application Ser. No. 16/171,785.5, filed in Europe on May 27, 2016. The entirety of each of the above-identified applications is expressly incorporated herein by reference.

BACKGROUND OF THE INVENTION

Field of the Invention

The invention relates to job programming.

Background of the Invention

US2008/0151285A1 discloses a method of job programming for print jobs for pad printing. The print jobs comprise machine readable instructions. Pads comprise more than one copy of at least one reference page. Where it comprises multiple copies of two or more reference pages, the copies in a pad may be collated or uncollated.

The method disclosed in US2008/0151285A1 comprises programming an overall number of copies of each page in case of uncollated printing.

US2008/0151285A1 also discloses entering the number of copies of sets of collated pages in the case of collated printing.

US2008/0151285A1 also discloses programming a number of copies for each individual page included in the printed pads e.g. by having a plurality of programming boxes for entering the number of copies per page or by allowing multiple sets of a page number paired with a number of copies.

The method of US285' however leads to incompatibility problems in practice. Hereinafter, although the term print job is used, the machines to process the print jobs are indicated as image forming apparatus. The image forming apparatus may comprise a scanner and may be able to copy scanned originals. An image forming apparatus may comprise an inline finisher, such as a stapler, a glueing unit, or a binding unit.

The programming of the print job is preferably done by a computer program product that is independent of the controller of an image forming apparatus. For instance, the programming can be performed on a print server.

More specifically the method of US285' is not compatible with a number of image forming apparatus. Suppose that a single product needs to be produced based on the input file comprising for instance
a reference page 1,
a reference page 2 and
a reference page 3.

Suppose the desired product (finished pad) comprises a collated part, an uncollated part and a cover front and back sheet such as in the following order:
a cover front sheet,
a copy of reference page 1,
a copy of reference page 2 and then
a number of copies of those two pages in this order (i.e. collated pages), followed by
a copy of reference page 3 and
a further number of copies of page 3 (i.e. uncollated pages) and
a cover back sheet.

It is undesirable to create two job tickets leading to two print results. This is because the two print results are treated separately by existing image forming apparatus. Existing image forming apparatus are not equipped to finish the two print results of two job tickets into one finished product for instance by gluing or stapling and adding a cardboard back cover.

SUMMARY OF THE INVENTION

The technical problem to be solved by the invention is to provide a method of job programming that outputs printable files for producing a pad with both collated and uncollated pages compatible with image forming apparatus not capable of finishing separate print results into one finished product.

The object of the invention is achieved in an embodiment of the invention providing a computer implemented method of job programming comprising the steps of
using a processor to assemble a printable file based on more than two reference pages of an input file and a plurality of print instructions;
including printer readable instructions in the printable file to print more than one copy of a reference page of the more than two reference pages;
wherein
grouping a first set of reference pages of the input file into a first group based on a first plurality of print instructions;
using a processor to assemble a first part of the printable file based on the first group and the first plurality of print instructions;
grouping a second set of reference pages of the input file into a second group based on a second plurality of print instructions;
using a processor to assemble a second part of the printable file based on the second group and the second plurality of print instructions;
including printer readable instructions in the printable file to direct printed pages corresponding to the printer readable instructions to print more than one copy of the reference page to a common stack, to direct printed pages corresponding to the first part of the printable file to the common stack and to direct printed pages corresponding the second part of the printable file to the common stack.

Because the method comprises the step of including printer readable instructions in the printable file to print more than one copy of a reference page of the more than two reference pages, the method can be applied for producing pads from the printable file.

By grouping the first set of reference pages into a first group and grouping the second set of reference pages into a second group and assembling the first part of the printable file and assembling the second part of the printable file in different steps, a single printable file is created and the method is compatible with existing printers.

Because the first part of the printable file is assembled based on the first plurality of print instructions and the second part of the printable file is assembled based on the second plurality of print instructions instead of the first plurality of print instructions, the flexibility of the method is increased. For instance the first plurality of print instructions and the second plurality of print instructions can differ in that they instruct collated or uncollated copies, printed page numbers or not printed page numbers, colour of paper to be used etcetera.

By including printer readable instructions to direct printed pages corresponding to the printer readable instructions to print more than one copy of the reference page to a common stack, to direct printed pages corresponding to the first part of the printable file to the common stack and to direct printed pages corresponding the second part of the printable file to the common stack, compatibility with existing image forming apparatus is achieved with enhanced flexibility.

The skilled man will appreciate that the order of the steps may be varied such that grouping the second set may occur before or simultaneously with assembling the first part of the printable file.

The skilled man will also appreciate that either the first set of reference pages and the second set of reference pages may comprise the reference page of the more than two reference pages.

In a further embodiment the computer implemented method comprises
- adding printer readable instructions to print first information based on the plurality of print instructions to the first part of the printable file such that the first information is printed on copies of the first group;
- adding printer readable instructions to print second information based on the plurality of print instructions to the second part of the printable file such that the second information is printed on copies of the second group;

wherein the first information differs from the second information.

By printing first information on the copies of the first set of reference pages, for instance headers, footers, page numbers or line numbers may be included.

Likewise, by printing second information on the copies of the second set of reference pages, for instance headers, footers or page numbers may be included.

The first information differs from the second information and is based on the plurality of print instructions. Because the first information differs from the second information, different sections or pages of a product printed from the printable file can be marked. Thus the plurality of print instructions can be used to mark different sections or pages of a product printed from the printable file.

The adding of printer readable instructions to print first information is preferably a part of the step of using a processor to assemble a first part of the printable file.

The adding of printer readable instructions to print second information is preferably a part of the step of using a processor to assemble a second part of the printable file.

In a further embodiment the adding the printer readable instructions to print first information is based on the first plurality of print instructions.

As the first information is based on the first plurality of print instructions, the first information can be specific for the copies of the first set of reference pages.

In a further embodiment the adding the printer readable instructions to print second information is based on the second plurality of print instructions.

As in use the first plurality of print instructions may differ from the second plurality of print instructions, the method provides flexibility in the first information and second information printed.

In an embodiment, the first information differs from the second information in that the first information and the second information relate to consecutive numbering.

As the consecutive numbering here corresponds to first information and second information and thus to copies of the first group and the second group, the usefulness of the pad comprising copies of the first group and the second group is contributed to. It makes it easier for a user to navigate through the pad. The skilled man will appreciate that the print instructions differ as no two pages should receive the same number. For instance in the second plurality of print instructions, the offset for the page numbers can be different from the offset for the page numbers in the first plurality of print instructions. The offset can even be relational in that the second set of print instruction can refer to the page number in any last page to be printed before the copies of the second set of reference pages are printed.

The consecutive numbering encompasses page numbers, line numbers, chapter numbers, head note numbers, footnote numbers.

According to an aspect of the invention, there is provided a computer program product adapted to perform any of the embodiments of the computer implemented method of job programming provided by the invention.

According to a further aspect of the invention, there is provided a record carrier comprising a computer program product adapted to perform any of the embodiments of the computer implemented method of job programming provided by the invention.

According to an additional aspect of the invention, there is provided a server comprising a record carrier and configured for enabling downloading a computer program product adapted to perform any of the embodiments of the computer implemented method provided by the invention.

According to another aspect of the invention, there is provided an image forming device comprising a record carrier comprising the computer program product adapted to perform any of the embodiments of the computer implemented method of job programming provided by the invention.

According to another aspect of the invention, there is provided a product produced using a printable file according to any of the embodiments of the method of job programming provided by the invention.

BRIEF DESCRIPTION OF THE DRAWINGS

The present invention will now be described using examples in conjunction with the accompanying drawings, wherein the same reference numerals have been used to identify the same or similar elements.

DETAILED DESCRIPTION OF THE PREFERRED EMBODIMENTS

Herein, a print job is a set of machine readable instructions. Print jobs are transferred via a printable file.

First Example

In an example of the present invention a pad is printed using a method comprising a number of steps. The example is explained using FIG. 1, FIG. 2 and FIG. 3.

Figure 1:
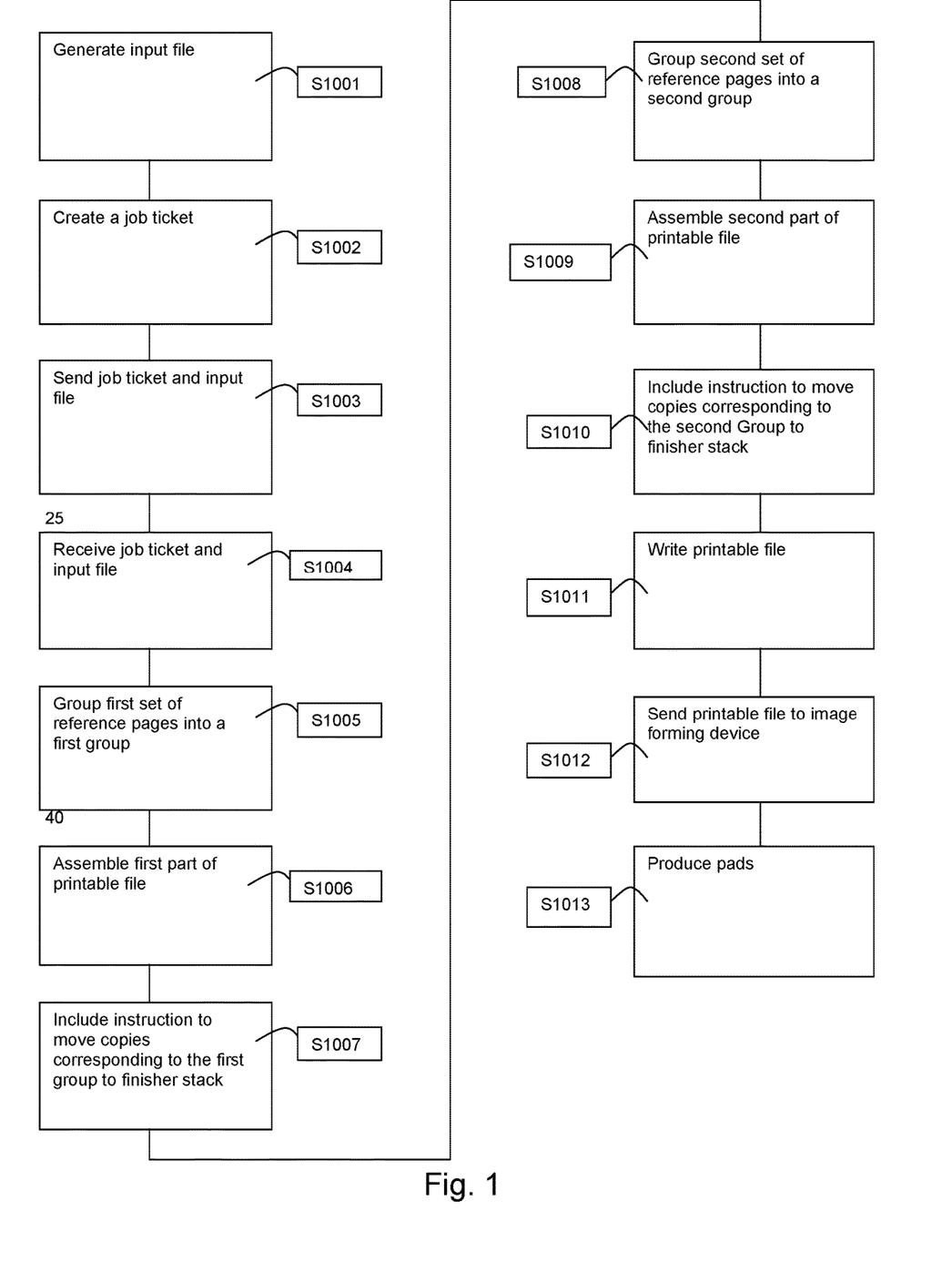
FIG. 1 Flow diagram showing some of the steps in a process according to the first example FIG. 2 input file comprising five reference pages FIG. 3 pad produced according to the invention FIG. 4 pad produced according to the invention FIG. 5 imposed sheet faces according to a fourth example of the invention

In a first step (S1001) of the method a word processor program running on a workstation generates an input file (10) in response to actions by a user such as typing (FIG. 1). The input file comprises (FIG. 2) a first reference page (11), a second reference page (12), a third reference page (13), a fourth reference page (14) and a fifth reference page (15).

After the first step of the method, a plurality of print instructions is entered or confirmed by the user. In response to the entering or confirming print instructions by the user the word processor creates a job ticket in a second step (S1002) of the method. Creating the job ticket is done by the word processor after receiving input corresponding to the user clicking a print button. To collect the input to be received, the word processor presents a number of dialog windows to the user. Among other things, the dialog windows present the option to select ranges of reference pages, to select collated or uncollated, to select a number of copies, to select page numbering and to select if page numbering is continuous throughout the copies of the ranges, to select if the pages are not only numbered but that the page numbers are printed as well and to select a front cover and a back cover. For the selection of collated or uncollated, the default value is collated and this value may be confirmed when appropriate. For page numbering, a default value is not suggested and a value has to be entered.

Figure 2:
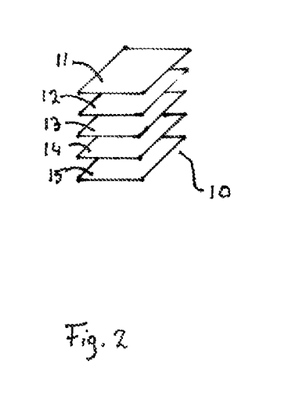
Figure 3:
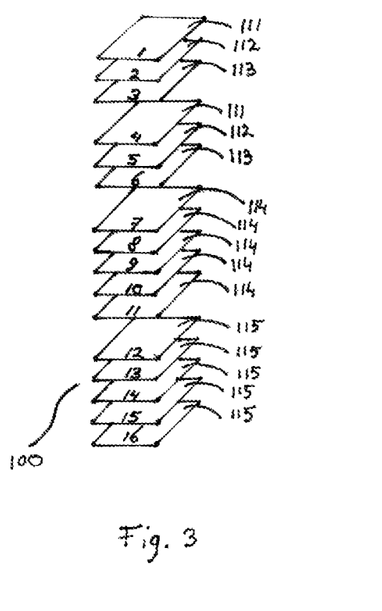

To realise a pad (100) the plurality of print instructions comprise a first plurality of print instructions that comprise a range selection selecting the first reference page (11), the second reference page (12) and the third reference page (13) for a first range. The print instructions further comprise an instruction to collate the copies of the reference pages in the first range. The print instructions further comprise an instruction to print two copies of the first range of reference pages.

Herein, the copies of the first range of reference pages together form a first stack of copies.

Also, herein: the print instructions relating to the first range of reference pages only form a first plurality of print instructions. Generic print instructions complete the plurality of print instructions relating to the copies of the first range of reference pages. In this example the generic print instructions comprise an instruction for printing in a single sided way.

The print instructions further comprise a range selection selecting the fourth reference page (14) and the fifth reference page (15) for a second range. Instead of having an instruction to print the copies of the second range of pages in a collated way, the print instructions further comprises an instruction to print uncollated copies of the reference pages in the second rage. The print instructions further comprise an instruction to print five copies of the second range of reference pages. The five copies of the reference pages in the second range together form a second stack of copies. The print instructions relating to copies of the reference pages in the second range only form a second plurality of instructions. The generic print instructions complete the print instructions relating to the copies of the reference pages in the second range.

The skilled man will observe that as the print instructions relating to the first range of reference pages comprise instructions to collate and to print 2 copies and the print instructions relating to the second range comprise instructions to print uncollated and to print five copies, the print instructions relating to the first range of reference pages and the print instructions relating to the second range of reference pages differ, i.e. the first plurality of print instructions differs from the second plurality of print instructions.

The plurality of print instructions also comprises a print instruction to finish the copies of the first range of reference pages (i.e. the first stack of copies) and the copies of the second range of reference pages (i.e. the second stack of copies) by gluing them together into a glued intermediate stack. The plurality of print instructions also comprises a generic print instruction to add a front cover from a front cover tray and to add a cardboard back cover from a back cover tray and to attach the front cover and the back cover to the glued stack.

In addition, the plurality of print instructions comprises an instruction to number the copies of the first range of pages and the copies of the second range of pages in a consecutive way, an instruction to print the page numbers on the first stack of copies in the first plurality of print instructions and an instruction to print the page numbers on the second stack of copies in the second plurality of print instructions. In this example this means that the last copy of a reference page in the first range of reference pages will have first information in the form of a page number 6 printed on the copy and that the first copy of the second range of pages (here the first copy of the fourth reference page) will have second information in the form of a page number 7 printed on the copy.

The plurality of print instructions also comprises an instruction to produce 15 pads (100).

In a third step (S1003) of the method the job ticket comprising the plurality of print instructions is sent along with the input file (10) to a preparation server.

In a fourth step (S1004) of the method the input file (10) is received from the work station by a preparation program running on a preparation server. In the same step (S1004) the preparation program on the preparation server also receives the job ticket comprising the plurality of print instructions from the work station that are to result in a number of pads (100) (FIG. 3).

The preparation program is run by a processor on the preparation server. The preparation server is a dedicated personal computer running the preparation program on a microprocessor. The preparation server is connected to the workstation and an image forming device over a network. The preparation program is arranged to execute a method of job programming.

The preparation program receives the input file (10) and the job ticket comprising the plurality of print instructions (S1004). Running the preparation program, the microprocessor reads and processes the plurality of print instructions according to the method of job programming.

After reading the print instructions regarding the first range of reference pages, the processor running the preparation program (and thus executing the method of job programming) groups the first range of reference pages into a first group (S1005). The processor running the preparation program then assembles (S1006) a first part of a printable file based on the print instructions regarding the first group. The first part of the printable file comprises printer readable instructions such as take a new sheet from a specific input tray and print dots at positions x1,y1 and x2,y2 on the sheet. As the plurality of print instructions comprises an instruction to finish the copies of the first range and the second range of reference pages by glueing them together into a glued intermediate stack, the preparation program includes (S1007) a printer readable instruction to move the copies corresponding to the first group to a finisher input stack in first part of the printable file. The first part of the printable file is stored in a memory of the preparation server.

After reading the print instructions regarding the second range of reference pages, the processor running the preparation program groups (S1008) the second range of reference pages into a second group. The processor running the preparation program then assembles (S1009) a second part of a printable file based on the print instructions regarding the first group. Because of the instruction to finish the copies of the first range and the second range of reference pages by glueing them together, the processor running the preparation program includes (S1010) a printer readable instruction to move the copies corresponding to the second group to the finisher input stack in second part of the printable file. The second part of the printable file is stored in the memory of the preparation server.

After processing all instructions of the plurality of instructions including (but not shown in FIG. 1) the instructions to add a front cover, a cardboard back cover and to print page numbers, the first part of the printable file and the second part of the printable file are written (S1011) to a hard disk to form the printable file, which is a single printable file.

The printable file is sent to an image forming device as a print job in a twelfth step (S1012) of the method. At the image forming device, the copies are printed and placed in the finisher input stack, glued together and a front cover and a cardboard end cover are glued to the copies to produce a pad (100) in a thirteenth step (S1013) of the method. The steps from printing onward are repeated 14 times to produce a total of 15 pads (100).

The structure of a pad (100) printed by an image forming device from the input file (10) using the present invention will now be described (FIG. 3). Copies (111) of the first reference page (11), copies (112) of the second reference page (12) and copies (113) the third reference page (13) are present in the pad (100) in a collated set op copies. In the example, there are two sets of copies. In addition, the pad (100) comprises five copies (114) of the fourth reference page (14) and five copies (115) of the fifth reference page (15). The front cover and the cardboard back cover are not shown in FIG. 3.

In a variant of the method according to the example described above, the printable file is sent by the preparation server to a print server (not shown in FIG. 1) instead of directly to the image forming device. The print server places the printable file in a queue. When it is the turn of the printable file to be printed, the printable file is sent to the image forming device. At the image forming device, the copies are printed and placed in the finisher input stack, glued together and a front cover and a cardboard back cover are glued to the copies to produce a pad (100). This is repeated 14 times to produce a total of 15 pads (100).

Second Example

In a second example (FIG. 4), the input file is the same as the input file (10) of the first example. The differences with the first example are that:
- the fifth reference page is not selected for the second range and that the instruction to print the five copies of the second range in uncollated way is absent. The latter instruction is not relevant anymore, as the second range only comprises the forth reference page;
- the fifth reference page is selected for a third range of reference pages;
- the presence of a third plurality of print instructions regarding the third range of reference pages only;
- the presence of a print instruction in the third plurality of print instructions that copies of the pages in the third range need to be present after each set of copies of a range, in this example that means after the first stack of copies and after the second stack of copies;
- the presence of a print instruction not to print page numbers on the copies of the pages in the third range.

Figure 4:
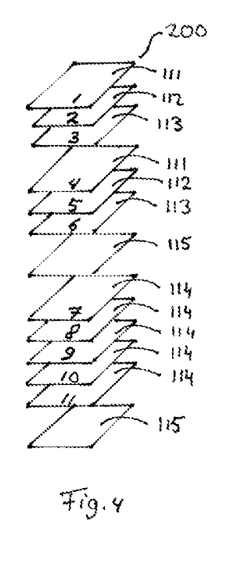

For the rest the method is equal to the method of the first example. Herein, the copies of the pages in the third range form a third stack of copies both after the first stack op copies and after the second stack of copies.

In the resulting pad (200) the copies of the fifth reference page function as separator pages. The reference page itself comprises the text "Notes". The text as printed on the resulting pad (200) is not shown. As the instruction to number the first stack of pages and the second stack of pages consecutively is still present, the number of the first page in the second stack is still seven.

The front cover and the cardboard back cover are not shown in FIG. 4.

Third Example

A third example (not shown) differs from the second example in that the instruction to number the first stack of pages and the second stack of pages consecutively is absent. Instead, there is an instruction to number the copies in all stacks of copies consecutively. In addition the print instruction not to print page numbers on the copies of the pages in the third range (i.e. each third stack of copies) is absent. The third plurality of print instructions comprises an instruction to print page numbers the third stack of copies.

In the third example a front cover and a cardboard back cover are present as well, like in the second example.

As in the second example, in this third example the rest of the method is similar to the first example.

In the resulting pad the copies of the fifth reference page still function as separator pages. The number of the first pages in the second stack now is 8, whereas the number printed on the copy of the fifth reference page (15) between the first stack of copies and the second stack of copies is 7. The number printed on the copy of the fifth reference page (15) after the second stack of copies and before the cardboard back cover is 13.

Fourth Example

Figure 5:
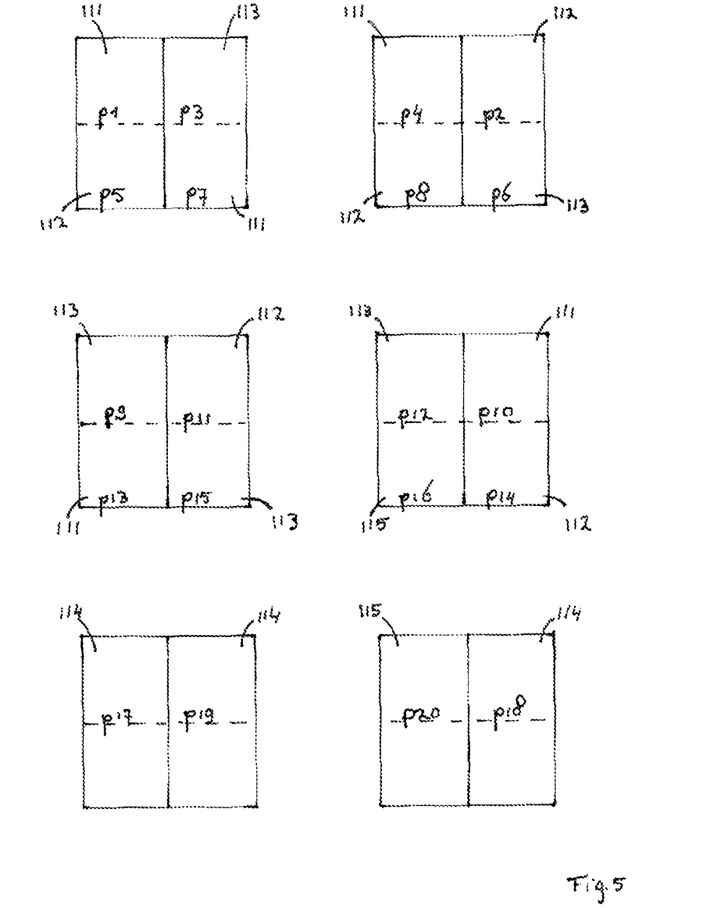

In a fourth example of a method according to the invention a double sided printed imposed pad is produced from the input file of the first example. In this example, the plurality of print instructions comprise a plurality of generic print instructions (general print instructions) and instructions specifically relating to three ranges (i.e. a first plurality of print instructions, a second plurality of print instructions and a third plurality of print instructions) as follows:

plurality of generic print instructions

| | |
|---|---|
| front cover | yes |
| cardboard back cover | yes |
| number of pages per printed sheet face | 4 |
| double sided | yes |
| binding | staple |
| number of ranges | 3 |
| printed page number format | add "p" |

First Plurality of Print Instructions

| input file pages | 11, 12 and 13 |
|---|---|
| collated | yes |
| number of copies | 5 |
| number pages | yes |
| finishing order | 1st |
| continue page numbers from | 0 |
| print page numbers | yes |

Second Plurality of Print Instructions

| input file pages | 14 |
|---|---|
| collated | — |
| number of copies | 3 |
| number pages | yes |
| finishing order | 2nd |
| continue page numbers from | predecessing printed page |
| print page numbers | yes |

Third Plurality of Print Instructions

| input file pages | 15 |
|---|---|
| collated | — |
| number of copies | 1 |
| number pages | yes |
| finishing order | separator after each stack of copies |
| continue page numbers from range | predecessing printed page |
| print page numbers | yes |

In the fourth example of the method, the input file (10) is generated in a first step (S1001) of the method by a word processor program as in the first example.

In a second step (S1002) of the method a job ticket is created by the word processor in response to entering or confirming the print instructions described for this fourth example.

In a third step (S1003) the job ticket and the input file (10) are sent to a preparation server by the word processor program. In a fourth step (S1004) of the method, the input file (10) and the job ticket are received by a preparation program run by a processor on a preparation server. The preparation server is a dedicated personal computer running the preparation program on a microprocessor and connected to the workstation and an image forming device over a network. The preparation program is arranged to execute a method of job programming. Running the preparation program, the microprocessor reads and processes the plurality of print instructions according to the method of job programming. The preparation program delivers a printable file.

After reading the plurality of general print instructions and the first plurality of print instructions, the second plurality of print instructions and the third plurality of print instructions, the processor running the preparation program (and thus executing the method of job programming) groups the first range of reference pages into a first group (S1005). The first plurality of print instructions relate to the first range of reference pages only. Likewise the second plurality of print instructions relates to the second range of reference pages only and the third plurality of print instructions relates to the third range of reference pages only.

The processor running the preparation program then assembles (S1006) a first part of a printable file based on the print instructions regarding the first group. The first part of the printable file comprises printer readable instructions such as take a new sheet from a specific input tray, print dots at positions x1,y1 and x2,y2 on the sheet.

The imposition instruction to print 4 pages per sheet face, is carried out in that a second part and a third part of the printable file are assembled (S1009) and that the corresponding parts are ordered according to the instructed page ordering for imposed double sided printing. This is shown in FIG. 5. Then the page numbers are assigned to the pages and instructions for printing page numbers are added. According to the plurality of generic print instructions all printed page numbers are preceded by the letter p.

As the general print instructions comprise an instruction to print double sided imposed sheets with 4 reference pages of the input file (10) per sheet face, a printer readable instruction is added to move all printed copies, i.e. the copies corresponding to the first group, the second group and the third group in the same finisher input stack (S1007,S1010). In addition, parts of the assembled printable file comprise printer readable instructions to add a front cover and a cardboard back cover.

So far the parts of the printable file are in a RAM memory part of the preparation server. In a next step (S1011) of the method, the printable file is written to a hard disk to form the printable file.

Then the printable file is sent to an image forming device in a twelfth step (S1012) of the method.

In a thirteenth step (S1013) the copies are printed based on the printer readable instructions in the printable file. The printed sheets are cut along the dashed lines shown in FIG. 5 in the finisher and ordered according to printer readable instructions to have the lower part of the sheet behind and not before the top part of the sheet in finisher stack. Before here means that the lower part of the sheet would end closer to the first page of the pad and behind here means that the lower part of the sheet would end closer to the cardboard back cover. Finally, the cut sheets, a front cover and a cardboard back cover are stapled together.

An advantage of this example is that the copy (115) of the fifth reference page is in between the first stack and the second stack without that copy being on a sheet in the pad having an empty back side.

Some or all aspects of the invention may be implemented in a computer program product, i.e. a collection of computer program instructions stored on a computer readable storage device for execution by a computer. The instructions of the present invention may be in any interpretable or executable code mechanism, including but not limited to scripts, interpretable programs, dynamic link libraries (DLLs) or Java classes. The instructions can be provided as complete executable programs, as modifications to existing programs or extensions ("plugins") for existing programs. Moreover, parts of the processing of the present invention may be distributed over multiple computers or processors for better performance, reliability, and/or cost.

Storage devices suitable for storing computer program instructions include all forms of non-volatile memory, including by way of example semiconductor memory devices, such EPROM, EEPROM, and flash memory devices, magnetic disks such as internal and external hard disk drives and removable disks, magneto-optical disks and CR-ROM disks. The computer program product can be distributed on such a storage device, or may be offered for download through http, FTP or similar mechanism using a server connected to a network such as the internet. Transmission of the computer program product by email is of course also possible.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combinations of such claims are herewith disclosed.

For instance, instead of sending the input file and the job ticket from a work station to a preparation server and then on to an image forming device, the preparation program may be running on the work station, the image forming device or a print server.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, such a reference to a structural element encompasses a computer readable medium carrying such computer executable instructions.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer implemented method of job programming comprising the steps of
    using a processor to assemble a printable file based on more than two reference pages of an input file and a plurality of print instructions;
    including printer readable instructions in the printable file to print more than one copy of a reference page of the more than two reference pages;
    grouping a first set of reference pages of the input file into a first group based on a first plurality of print instructions;
    using a processor to assemble a first part of the printable file based on the first group and the first plurality of print instructions;
    grouping a second set of reference pages of the input file into a second group based on a second plurality of print instructions;
    using a processor to assemble a second part of the printable file based on the second group and the second plurality of print instructions;
    including printer readable instructions in the printable file to direct printed pages corresponding to the printer readable instructions to print more than one copy of the reference page to a common stack, to direct printed pages corresponding to the first part of the printable file to the common stack and to direct printed pages corresponding the second part of the printable file to the common stack.

2. The computer implemented method according to claim 1, further comprising the steps of:
    adding printer readable instructions to print first information based on the plurality of print instructions to the first part of the printable file such that the first information is printed on copies of the first group;
    adding printer readable instructions to print second information based on the plurality of print instructions to the second part of the printable file such that the second information is printed on copies of the second group;
    wherein the first information differs from the second information.

3. The computer implemented method according to claim 2, wherein the adding of printer readable instructions to print first information is based on the first plurality of print instructions; or
    wherein the adding of printer readable instructions to print second information is based on the second plurality of print instructions.

4. The computer implemented method according to claim 2, wherein the first information differs from the second information in that the first information and the second information relate to consecutive numbering.

5. The computer implemented method according to claim 3, wherein the first information differs from the second information in that the first information and the second information relate to consecutive numbering.

6. The computer implemented method according to claim 1, further comprising the step of adding a printer readable instruction to impose multiple pages on a sheet.

7. The computer implemented method according to claim 2, further comprising the step of adding a printer readable instruction to impose multiple pages on a sheet.

8. The computer implemented method according to claim 3, further comprising the step of adding a printer readable instruction to impose multiple pages on a sheet.

9. The computer implemented method according to claim 4, further comprising the step of adding a printer readable instruction to impose multiple pages on a sheet.

10. The computer implemented method according to claim 5, further comprising the step of adding a printer readable instruction to impose multiple pages on a sheet.

11. A computer program product embodied on a non-transitory computer readable medium that, if executed on a processor, performs the steps of the method of claim 1.

12. A computer program product embodied on a non-transitory computer readable medium that, if executed on a processor, performs the steps of the method of claim 2.

13. A computer program product embodied on a non-transitory computer readable medium that, if executed on a processor, performs the steps of the method of claim 3.

14. A computer program product embodied on a non-transitory computer readable medium that, if executed on a processor, performs the steps of the method of claim 4.

15. A computer program product embodied on a non-transitory computer readable medium that, if executed on a processor, performs the steps of the method of claim 5.

16. An image forming device comprising a non-transitory computer readable medium comprising a computer program product adapted to perform the computer implemented method of claim 1.

17. An image forming device comprising a non-transitory computer readable medium comprising a computer program product adapted to perform the computer implemented method of claim 2.

18. An image forming device comprising a non-transitory computer readable medium comprising a computer program product adapted to perform the computer implemented method of claim 3.

19. An image forming device comprising a non-transitory computer readable medium comprising a computer program product adapted to perform the computer implemented method of claim 4.

20. An image forming device comprising a non-transitory computer readable medium comprising a computer program product adapted to perform the computer implemented method of claim 5.

* * * * *